United States Patent
Aronowitz et al.

(10) Patent No.: US 7,469,205 B2
(45) Date of Patent: Dec. 23, 2008

(54) APPARATUS AND METHODS FOR PRONUNCIATION LEXICON COMPRESSION

(75) Inventors: Hagai Aronowitz, Petah Tikva (IL); Adoram Erell, Herzlia (IL)

(73) Assignee: Marvell International Ltd., Hamilton (BM)

( * ) Notice: Subject to any disclaimer, the term of this patent is extended or adjusted under 35 U.S.C. 154(b) by 782 days.

(21) Appl. No.: 10/879,259

(22) Filed: Jun. 30, 2004

(65) Prior Publication Data

US 2006/0004564 A1    Jan. 5, 2006

(51) Int. Cl.
*G06F 17/21* (2006.01)
*H03M 7/00* (2006.01)
(52) U.S. Cl. .......................... 704/10; 341/50
(58) Field of Classification Search ............. 704/10
See application file for complete search history.

(56) References Cited

U.S. PATENT DOCUMENTS 6,070,140 A * 5/2000 Tran ..................... 704/275

2002/0123882 A1 * 9/2002 Mohammed ............. 704/10

OTHER PUBLICATIONS

Bagshaw, Paul C., 'Phonemic transcription by analogy in text-to-speech synthesis: Novel word pronunciation and lexicon compression', Computer Speech and Lanugage (1998) 12, pp. 119-142.*

* cited by examiner

*Primary Examiner*—David R Hudspeth
*Assistant Examiner*—Justin W Rider

(57) ABSTRACT

A compressed pronunciation lexicon file is generated from a source pronunciation lexicon using a pronunciation prediction algorithm in a multi-output mode. The pronunciation prediction algorithm may generate a deterministic ordered list of phoneme strings from the textual representation of a particular word. The compressed pronunciation lexicon file may include a sorted list of records of compressed textual representations of words and compressed phonetic representations of the words.

16 Claims, 9 Drawing Sheets

APPARATUS AND METHODS FOR PRONUNCIATION LEXICON COMPRESSION

BACKGROUND OF THE INVENTION

Pronunciation lexicons may be used to translate textual representation of words into their respective pronunciation, represented by a string of phonemes. A pronunciation lexicon may be stored in memories of electronic devices, mobile or stationary. Memory size constraints in such electronic devices may restrict the size of such a pronunciation lexicon.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

Figure 1:
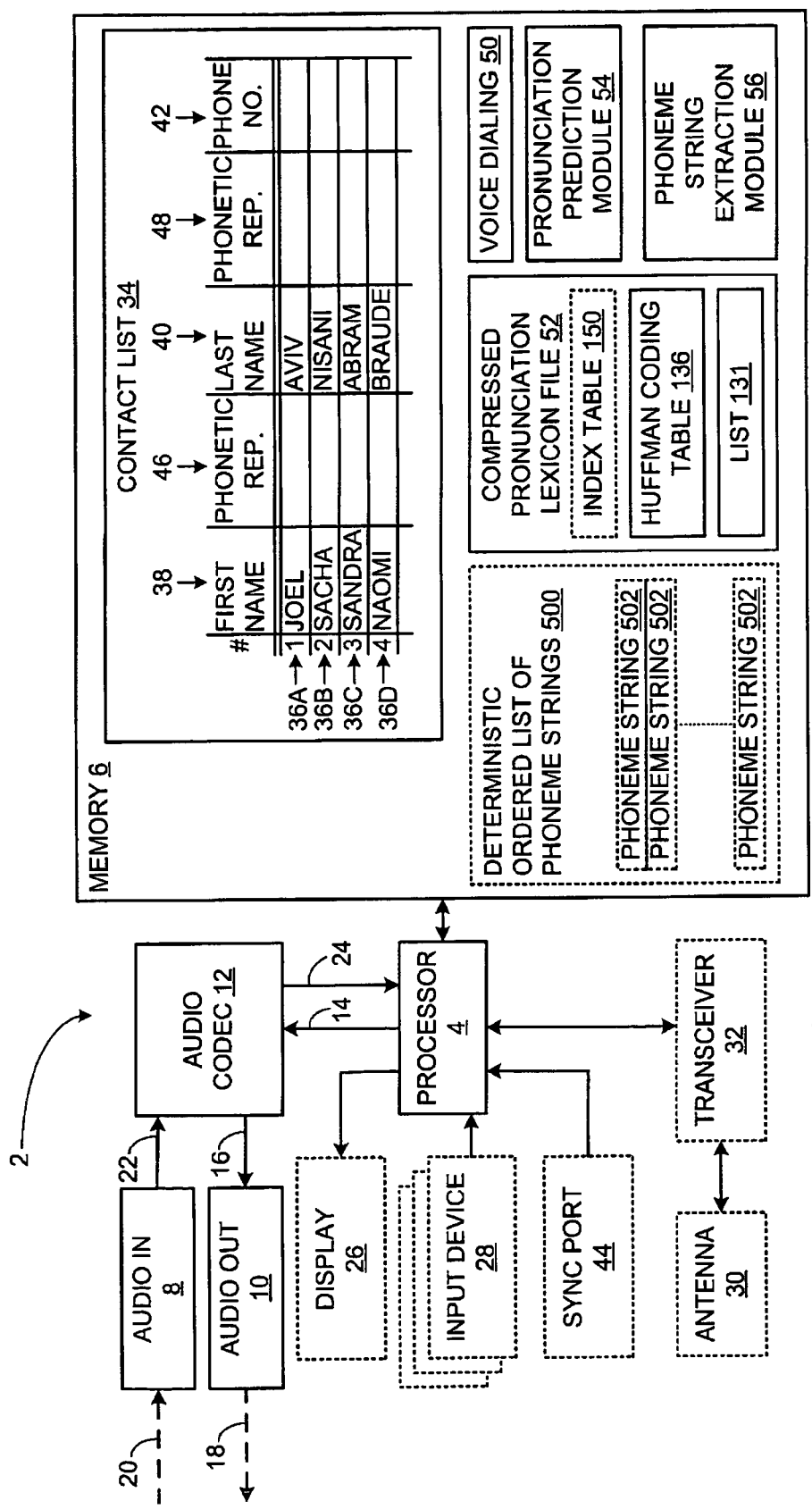
FIG. 1 is a block diagram of an exemplary apparatus, according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Some portions of the detailed description which follow are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that may manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

FIG. 1 is a block diagram of an exemplary apparatus 2, according to some embodiments of the invention. Apparatus 2 may include a processor 4 and a memory 6 coupled to processor 4.

A non-exhaustive list of examples for apparatus 2 includes a cellular telephone, a wireless telephone, a mobile telephone, a game console, a personal digital assistant (PDA), a handheld computer, a laptop computer, a notebook computer, a desktop personal computer, a work station, a server computer, and the like.

A non-exhaustive list of examples for processor 4 includes a central processing unit (CPU), a digital signal processor (DSP), a reduced instruction set computer (RISC), a complex instruction set computer (CISC) and the like. Moreover, processor 4 may be part of an application specific integrated circuit (ASIC) or may be a part of an application specific standard product (ASSP).

Memory 6 may be fixed in or removable from apparatus 2. A non-exhaustive list of examples for memory 6 includes any combination of the following:

a) removable memories, such as compact flash (CF) memory cards, personal computer memory card international association (PCMCIA) memory cards, security identity module (SIM) cards, MEMORY STICK® cards, universal serial bus (USB) KEY® memory cards, and the like,
b) semiconductor devices, such as read only memory (ROM), mask ROM, electrically erasable programmable read only memory devices (EEPROM), non-volatile random access memory devices (NVRAM), not AND (NAND) flash memory devices, not OR (NOR) flash memory devices, synchronous dynamic random access memory (SDRAM) devices, RAMBUS dynamic random access memory (RDRAM) devices, double data rate (DDR) memory devices, static random access memory (SRAM), and the like,
c) optical devices, such as compact disk read only memory (CD ROM), and the like, and
d) magnetic devices, such as a hard disk, a floppy disk, a magnetic tape, and the like.

Apparatus 2 may include an audio input device 8, such as, for example, a microphone, an audio output device 10, such as, for example, a loudspeaker, an earphone, a headphone, and the like, and an audio coder-decoder (codec) 12.

Codec 12 may be able to receive a digital representation 14 of sound waves from processor 4 and to output a corresponding analog signal 16 to audio output device 10. Audio output device 10 may be able to receive analog signal 16 and to output sound waves 18 corresponding to analog signal 16. For example, codec 12 may receive a digital representation 14 of sound waves of a voice pronouncing the name "George" and as a result, audio output device 10 may produce sound waves 18 corresponding to the name "George".

In addition, audio input device 8 may be able to receive sound waves 20 and to output a corresponding analog signal 22 to codec 12. Codec 12 may be able to receive analog signal 22 and to output a digital representation 24 of analog signal 22 to processor 4. For example, audio input device 8 may receive sound waves of a user pronouncing the name "Ron", and as a result, processor 4 may receive a digital representation 24 of the voice pronouncing the name "Ron".

Apparatus 2 may optionally include a display 26 coupled to processor 4, and may optionally include one or more input devices 28, such as, for example, a mouse, a keyboard, a touch screen, a digital pen, and the like, coupled to processor 4. In addition, apparatus 2 may be optionally capable of wireless communication with other apparatuses and for at least that purpose, may optionally include an antenna 30 and a transceiver 32 coupled to antenna 30.

For clarity, in the following description, the invention is described by way of describing apparatus 2 as a cellular telephone and by way of describing a specific application. However, the invention is not at all limited in this respect, and it will be obvious to those skilled in the art how to modify the following for other applications and for other kinds of apparatus 2.

Memory 6 may store a contact list 34 of records 36. A record 36 may include at least a textual representation of a first name 38 of a person, a textual representation of a last name 40 of the person and a telephone number 42 of the person. A user may update or add records 36 by way of, for example, any of input devices 28, an optional synchronization port 44 of apparatus 2 or transceiver 32. It may be appreciated that contact list 34 may include several and even hundreds of records, although for clarity, only four records, 36A-36D are shown in detail in FIG. 1.

A user may display a partial content of contact list 34 on display 26, may select a particular one of records 36 and may operate apparatus 2 to dial the telephone number 42 stored in that particular record 36.

A record 36 may also include a phonetic representation 46 of first name 38 and a phonetic representation 48 of last name 40. In addition, memory 6 may store a voice dialing module 50 for at least enabling voice dialing for apparatus 2.

In response to a user pronouncing a person's first and/or last names in the vicinity of audio input device 8, voice dialing module 50 may receive from codec 12 a digital representation of the user's voice pronouncing the first name and/or a digital representation of the user's voice pronouncing the last name.

Voice dialing module 50 may convert the digital representation of the user's voice pronouncing the first and the last names into textual representations, and may search contact list 34 for a record 36 including a first name 38 and a last name 40 that substantially match these textual representations. If such a record 36 is found, voice dialing module 50 may fetch the corresponding phonetic representations 46 and 48 from the found record 36.

Voice dialing module 50 may form a digital representation of a sentence including the corresponding phonetic representations 46 and 48 to ask the user to confirm the selection. Voice dialing module 50 may send the digital representation of the sentence to audio output device 10 through codec 12, and if a confirmation is received from the user by way of, for example, audio input device 8 or one of input devices 28, voice dialing module 50 may activate dialing the corresponding telephone number 42.

Memory 6 may store a compressed pronunciation lexicon file 52, a pronunciation prediction module 54 and a phoneme string extraction module 56. Compressed pronunciation lexicon file 52, described in further detail hereinbelow with respect to FIGS. 2-7, may contain, in a compressed form, a vast amount of names and their corresponding phonetic representations, and may be a source for at least some of the phonetic representations stored in contact list 34.

Phoneme string extraction module 56 may implement a method to fetch phonetic representations of names from compressed pronunciation lexicon file 52 and to store the fetched phonetic representations in contact list 34. An exemplary method to be implemented in phoneme string extraction module 56 is described hereinbelow with respect to FIGS. 8 and 9. Pronunciation prediction module 54 may implement a pronunciation prediction algorithm in a multi-output mode, in which, in response to receiving a textual representation of a word, pronunciation prediction module 54 may output a list of one or more phoneme strings of possible pronunciations of the word. The list of possible pronunciations of the word may be used by phoneme string extraction module 56 while fetching phonetic representations of names from compressed pronunciation lexicon file 52. Pronunciation prediction module 54 may be based on a hidden Markov model (HMM).

Figure 2:
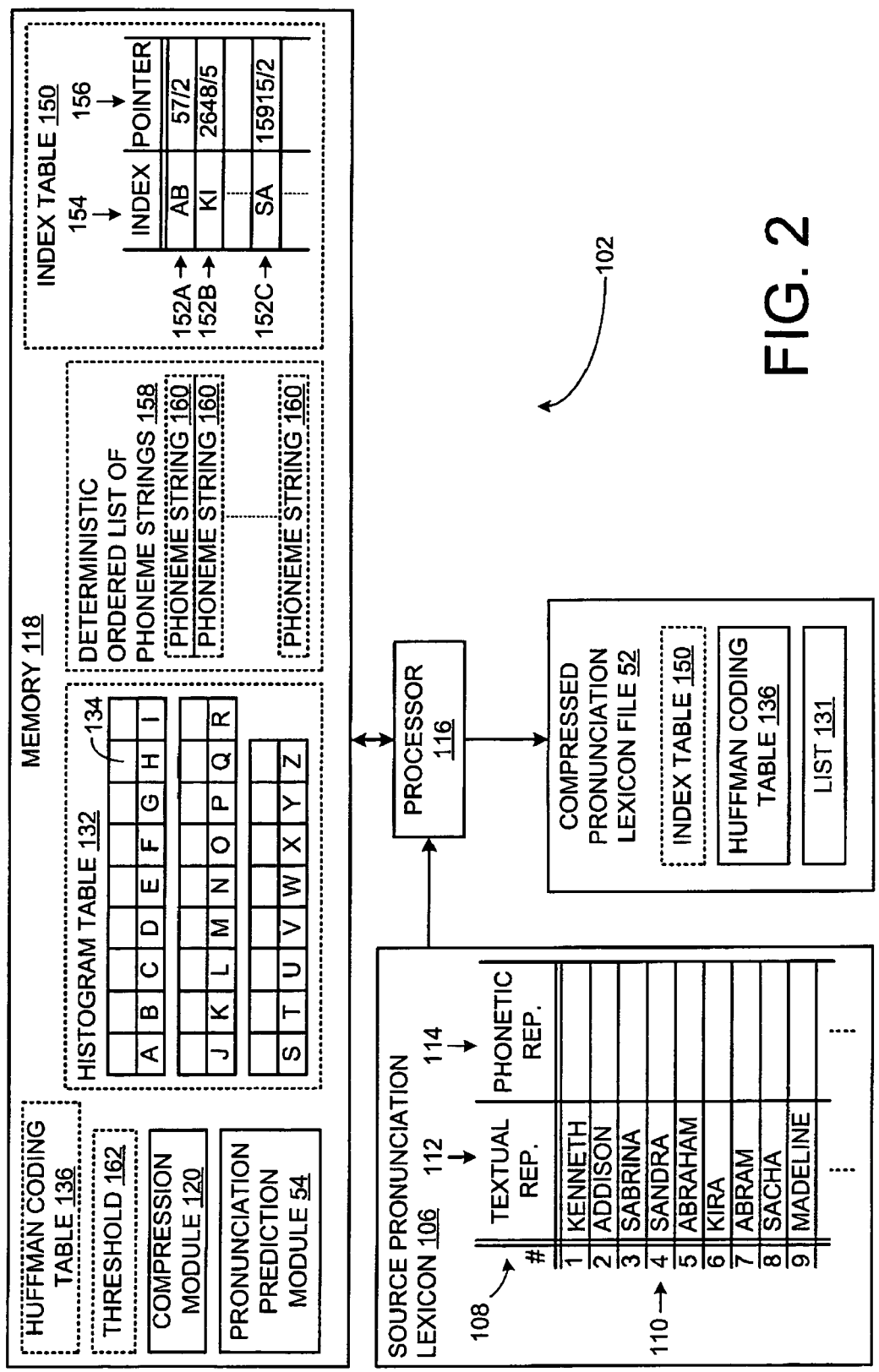
FIG. 2 is a block diagram of an exemplary apparatus to generate a compressed pronunciation lexicon file from at least a source pronunciation lexicon using a pronunciation prediction algorithm in a multi-output mode, according to some embodiments of the invention.

FIG. 2 is a block diagram of an exemplary apparatus 102 to generate compressed pronunciation lexicon file 52 from at least a source pronunciation lexicon 106 using a pronunciation prediction algorithm in a multi-output mode, according to some embodiments of the invention.

Source pronunciation lexicon 106 may include a list 108 of records 110. It may be appreciated that list 108 may include a vast amount of records, for example, 10,000, 25,000 or 75,000, although for clarity only nine records, numbered 1-9, are shown in detail in FIG. 2. A record 110 may include a textual representation of a word 112 and a respective phonetic representation 114, which may be a string of phonemes representing pronunciation of word 112. The words in the source pronunciation lexicon may be first names or last names of people, although the present invention is not limited in this respect. For example, the source pronunciation lexicon may include words of a general dictionary.

Apparatus 102 may include a processor 116 and a memory 118 coupled to processor 116. Memory 118 may store a compression module 120 and pronunciation prediction module 54, both to be executed by processor 116 during generation of compressed pronunciation lexicon file 52. Pronunciation prediction module 54 may implement a pronunciation prediction algorithm in a multi-output mode to receive a textual representation of a word and to output a deterministic ordered list of phoneme strings of possible pronunciations of the word.

Figure 3:
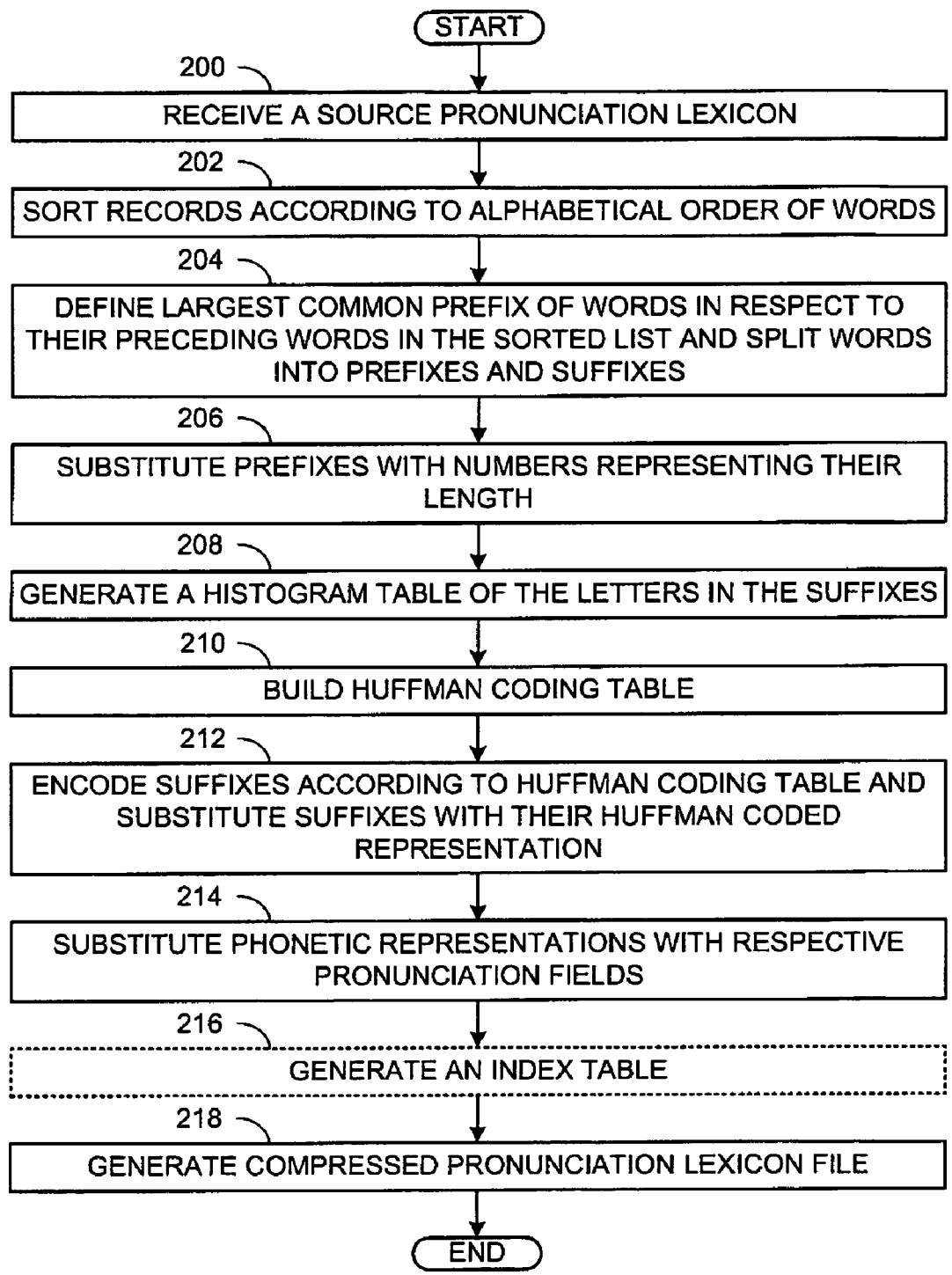
FIG. 3 is a flowchart illustration of an exemplary method for generating a compressed pronunciation lexicon file from at least a source pronunciation lexicon using a pronunciation prediction algorithm in a multi-output mode, according to some embodiments of the invention.

Reference is now made in addition to FIG. 3, which is a flowchart illustration of an exemplary method for generating compressed pronunciation lexicon file 52 from at least source pronunciation lexicon file 106 using a pronunciation prediction algorithm in a multi-output mode, according to some embodiments of the invention.

Compressed pronunciation lexicon file 52 may include a sorted list 131 of records of compressed textual representations and compressed phonetic representations. In the following example, the textual representations are compressed by sorting them in ascending alphabetic order and then separating the textual representations into prefixes and suffixes based on the textual representation of the preceding record (see FIG. 5), replacing the prefix with a prefix length and Huffman-encoding the suffix (see FIG. 6). Since Huffman encoding is used, compressed pronunciation lexicon file 52 includes a Huffman encoding table 136 or alternatively the corresponding Huffman decoding tree (not shown).

This form of compression of the textual representation implies serial decompression. Since list 131 may have hundreds of records, serial decompression of the entire list may be time consuming. Therefore, list 131 may be partitioned into sections, and compressed pronunciation lexicon file 52 may optionally include an index table 150 including pointers 156 to the beginning of each section in list 131 so that only one section of list 131 will be serially decompressed when searching for a particular word. Each pointer 156 may be associated with an index 154 storing a string of, for example, one or two letters. The record of list 131 that is the beginning of a section will include a compressed word that begins with the string stored in index 154. Records of list 131 pointed to by pointers 156 in index table 150 may be distributed fairly evenly in list 131. Index table 150 may include several and even hundreds of entries 152, although for clarity only three entries are show in detail in FIG. 2. The entries 152 of index table 150 may be sorted in alphabetical order of the indexes 154. The number of sections into which list 131 is partitioned is a trade-off between processor speed and memory consumption, and may be, for example, 1/50 of the number of words in source pronunciation lexicon file 106.

Any other suitable compression for the textual representations is also possible, as is the option of not compressing the textual representations.

Figure 5:
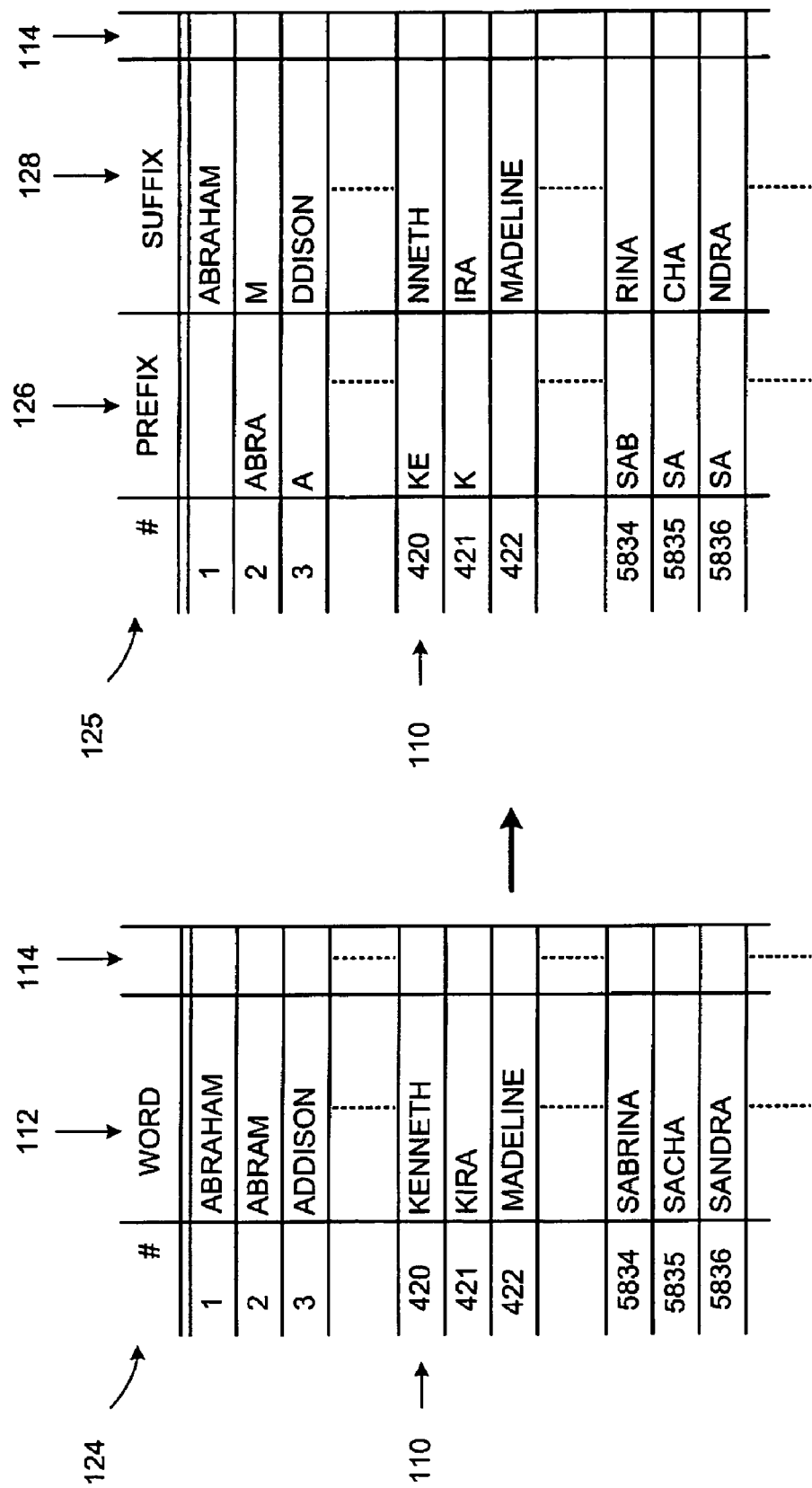
FIG. 5 is a schematic illustration of sorted lists used during generation of a compressed pronunciation lexicon file from at least a source pronunciation lexicon using a pronunciation prediction algorithm in a multi-output mode, according to some embodiments of the invention.

Compression module 120 may receive source pronunciation lexicon 106 (200), and may sort records 110 in an alphabetical order of textual representations 112 to generate a sorted list 124, as shown in FIG. 5 (202). In the example of FIG. 5, sorted list 124 is sorted in ascending alphabetical order. However, any other alphabetical sorting order, such as, for example, descending alphabetical order, is within the scope of the invention.

Compression module 120 may generate a sorted list 125 by splitting the textual representation of words 112 in sorted list 124 into prefixes and suffixes and by substituting the textual representation of words 112 in sorted list 124 with "prefix" fields 126 and "suffix" fields 128 (204), as shown in FIG. 5. The prefix field of a particular record may contain a longest string of the beginning letters of the word that are identical to the beginning letters of the word in the preceding record. Although the present invention is not limited in this respect, compression module 120 may limit the maximum number of letters in a prefix to for example, 5, 7 or 9.

For example, the longest string of beginning letters of the word "ABRAM" in record number 2 of sorted list 124 that are identical to the beginning letters of the word "ABRAHAM" in record number 1 of sorted list 124 is "ABRA". Accordingly, the string "ABRA" is defined as the prefix of record number 2 and the string "M" is defined as the suffix of record number 2 of list 125.

In another example, no beginning letters of the word "MADELINE" in record number 422 of sorted list 124 are identical to the beginning letters of the word "KIRA" in record number 421 of sorted list 124. Accordingly, no string of letters is defined as the prefix and the string of letters "MADELINE" is defined as the suffix in record number 422 of list 125.

In a yet another example, for the word in record number 1, no string of letters is defined as a prefix and the whole word, i.e. "ABRAHAM" is defined as the suffix in record number 1 of list 125.

Figure 6:
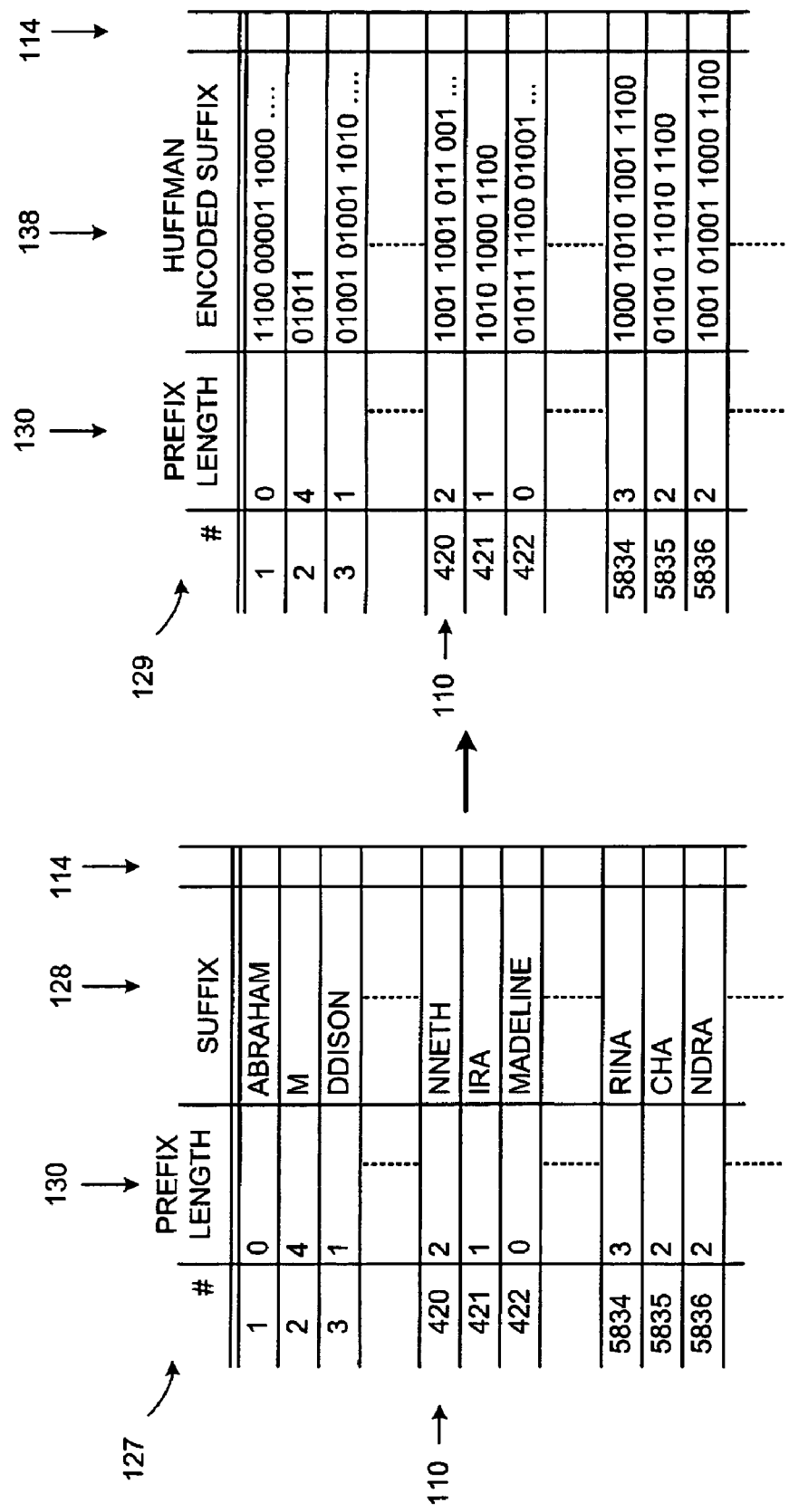
FIG. 6 is another schematic illustration of sorted lists used during generation of a compressed pronunciation lexicon file from at least a source pronunciation lexicon using a pronunciation prediction algorithm in a multi-output mode, according to some embodiments of the invention.

Compression module 120 may generate a sorted list 127 by substituting prefix fields 126 of sorted list 125 with "prefix length" fields 130, containing numbers representing the number of letters in the respective prefix fields 126 (206), as shown in FIG. 6.

Compression module 120 may generate a histogram table 132, shown in FIG. 2. Histogram table 132 may have twenty-six entries 134A-134Z, one each letter in the English alphabet. It may be appreciated that although in the example of FIG. 2, histogram table 132 has entries 134 corresponding to letters of the English alphabet, histogram table 132 may have instead, or in addition, entries corresponding to letters of other alphabets, such as, for example, Cyrillic, Latin, European, Hebrew, Arabic, and the like.

Compression module 120 may count the number of times each letter of the alphabet appears in suffix fields 128 and may store that number in the corresponding entry 134 (208). For example, compression module 120 may store in entry 134A the number of times the letter "A" appears in suffix fields 128.

Compression module 120 may generate Huffman coding table 136 from at least histogram table 132, shown in FIG. 2 (210).

Compression module 120 may generate a sorted list 129 by substituting suffix fields 128 of sorted list 127 with respective "Huffman encoded suffix" fields 138, as shown at FIG. 6. A Huffman encoded suffix field 138 may contain a number encoded by compression module 120 from the corresponding suffix field 128 using Huffman coding table 136 (212).

Figure 7:
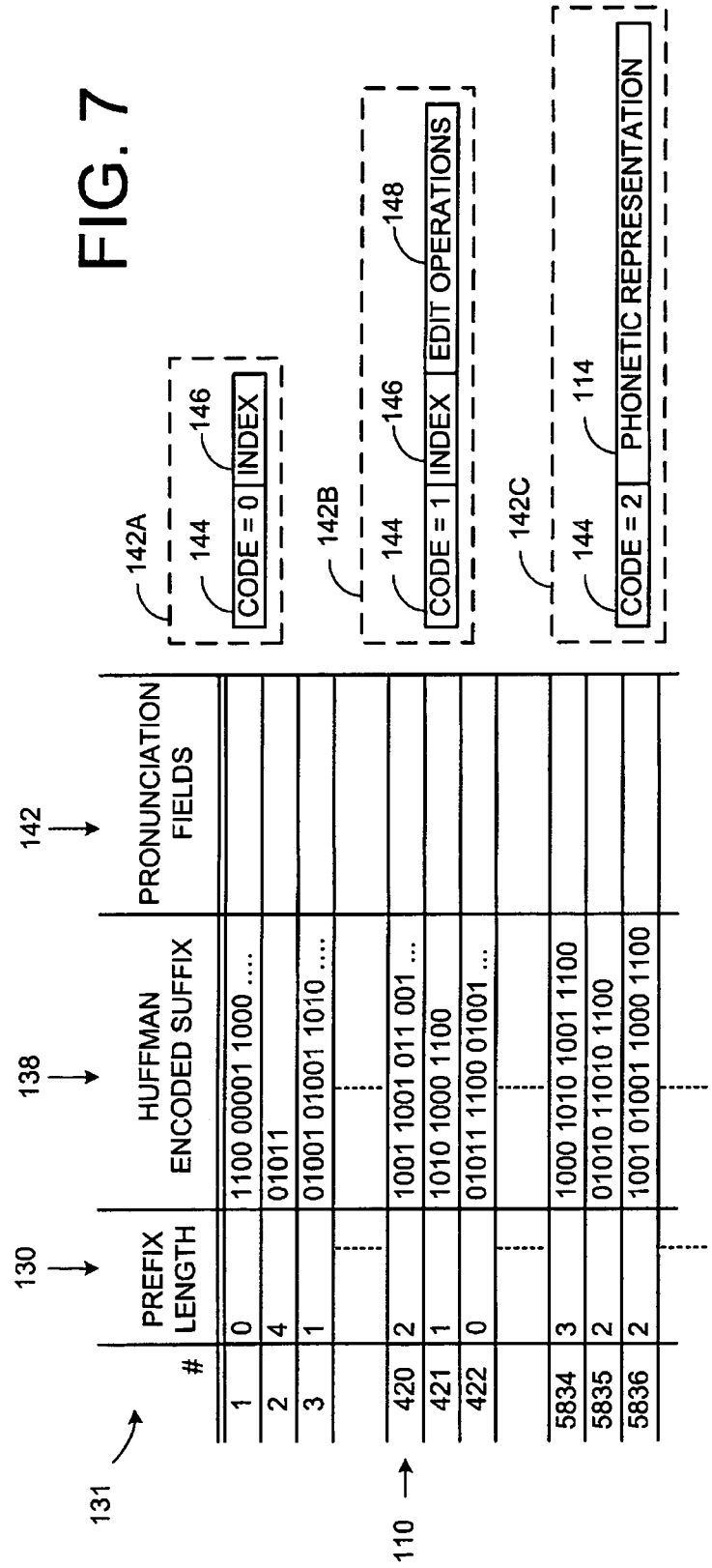
FIG. 7 is a schematic illustration of a sorted list to be embedded in a compressed pronunciation lexicon file, according to some embodiments of the invention.

Compression module 120 may generate sorted list 131 by substituting phonetic representations 14 of sorted list 129 with respective pronunciation fields 142, which may have one of three variations 142A, 142B and 142C (214), as shown at FIG. 7. An exemplary method for box (214) is presented in FIG. 4.

Variation 142A may include a code field 144 containing the value zero, for example, and an index field 146. Variation 142B may include code field 144 containing the value one, for example, index field 146, and an edit operations field 148.

Variation 142C may include code field 144 having the value two, for example, and the respective phonetic representation 114. Code field 144 may indicate the variation type of pronunciation fields 142 (A, B or C). Index field 146 and edit operations field 148 will be explained in the following paragraphs.

Compression module 120 may generate compressed pronunciation lexicon file 52 containing Huffman coding table 136, list 131, and optionally index table 150 (118), as shown in FIG. 2.

Figure 4:
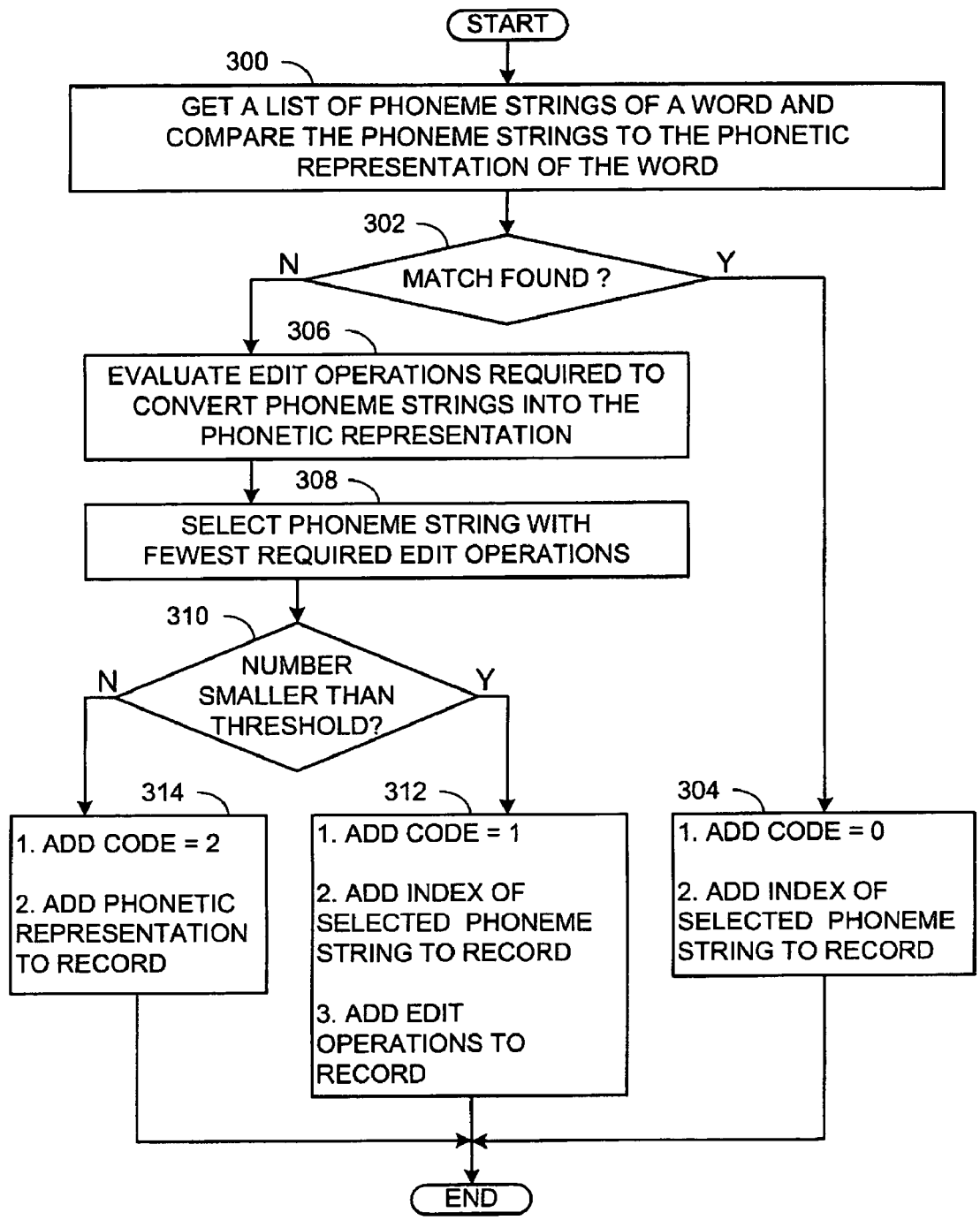
FIG. 4 is a flowchart illustration of an exemplary method for generating pronunciation fields of a compressed pronunciation lexicon file using a pronunciation prediction algorithm in a multi-output mode, according to some embodiments of the invention.

Reference is now made to FIG. 4, which is a flowchart illustration of an exemplary method for generating pronunciation fields of a compressed pronunciation lexicon file using a pronunciation prediction algorithm in a multi output mode, according to some embodiments of the invention.

Compression module 120 may activate pronunciation prediction module 54 to receive textual representation of a word 112 of a particular record 110, and to generate a respective deterministic ordered list 158 of phoneme strings 160 to optionally match phonetic representation field 114 of the particular record 110 (300). List 158 may be deterministic in the sense that identical input words to pronunciation prediction module 54 produce identical lists 158 having the same phoneme strings 160 in the same order.

Compression module 120 may compare phoneme strings 160 to the phonetic representation field 114, and if one of phoneme strings 160 exactly matches phonetic representation field 114 (302), compression module 120 may substitute phonetic representation field 114 of sorted list 129 with a pronunciation field 142 of type A (304). In pronunciation field 142A, index field 146 may contain an index of the matching phoneme string 160 in list 158. In other words, if a record in list 131 has a pronunciation field 142 of type A, it means that the phonetic representation 114 of the corresponding record in list 129 exactly matches one of the list 158 of phoneme strings 160 generated by pronunciation prediction module 54, and therefore it is sufficient to store only the index to the correct phoneme string in list 158.

If none of phoneme strings 160 exactly matches phonetic representation field 114, compression module 120 may evaluate the edit operations required to convert each of phoneme strings 160 to phoneme representation field 114 (306). For the phoneme string 160 having the fewest required edit operations (308), compression module 120 may check if the required number of edit operations is lower than a threshold 162, of, for example, one edit operation or two edit operations (310).

If the required number of edit operations is smaller than threshold 162, compression module 120 may substitute phonetic representation field 114 of sorted list 129 with a pronunciation field 142 of type B (312). In pronunciation field 142B, edit operations field 148 may contain an encoded description of the required edit operations. In other words, if a record in list 131 has a pronunciation field 142 of type B, it means that the phonetic representation 114 of the corresponding record in list 129 differs from one of the list 158 of phoneme strings 160 generated by pronunciation prediction module 54 only by a small number of edit operations, and therefore it is sufficient to store only the index to the phoneme string in list 158 and an encoded description of the edit operations.

However, if the required number of edit operations is equal to or higher than threshold 162, the method may substitute phonetic representation field 114 of sorted list 129 with a pronunciation field 142 of type C (314), containing a code to indicate that the pronunciation field is of type C and phonetic representation field 114.

Figure 8:
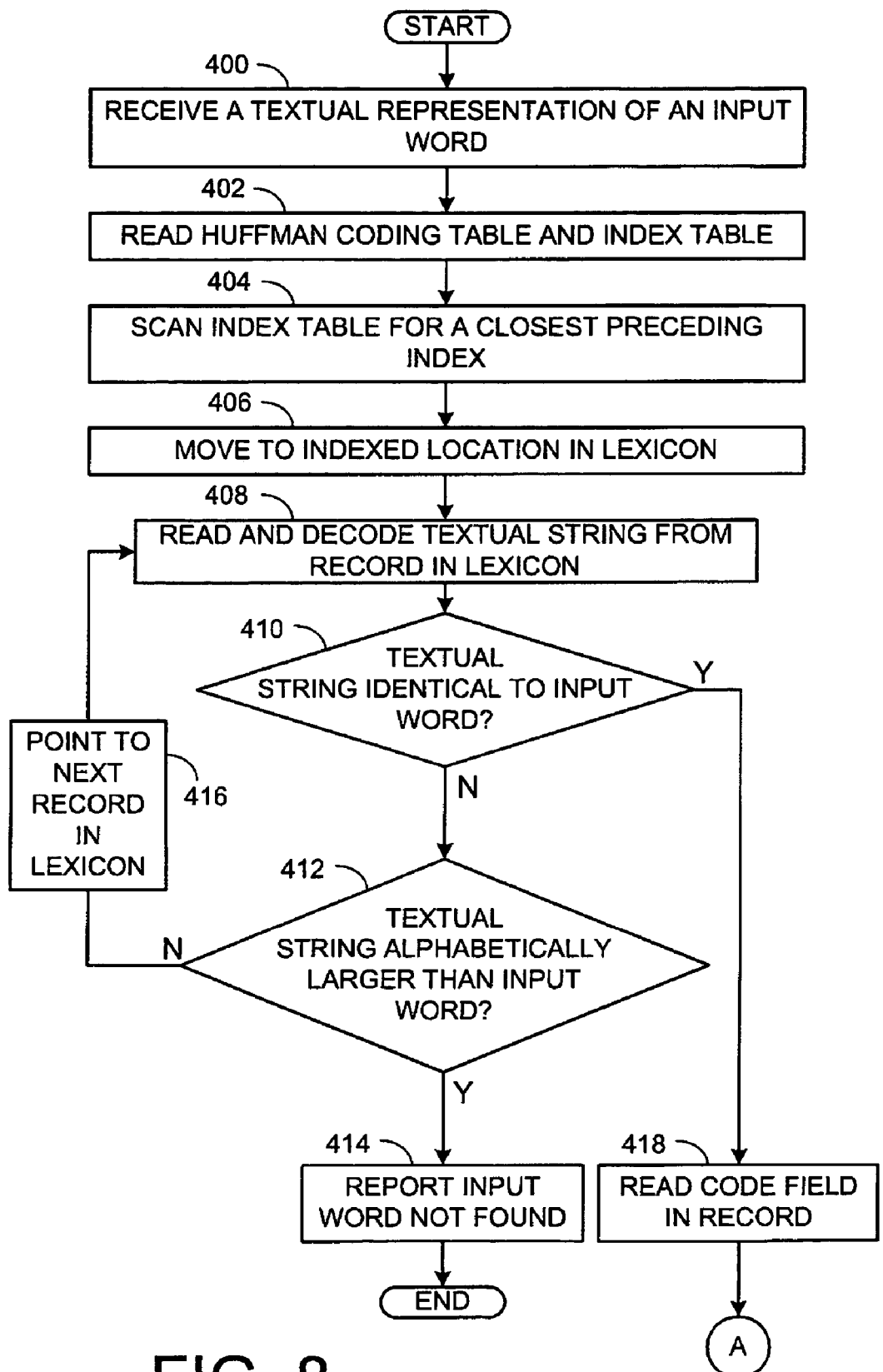
FIGS. 8 and 9 are a flowchart illustration of an exemplary method to extract phoneme strings from at least a compressed pronunciation lexicon file using a pronunciation prediction algorithm in a multi-output mode, according to some embodiments of the invention.
Figure 9:
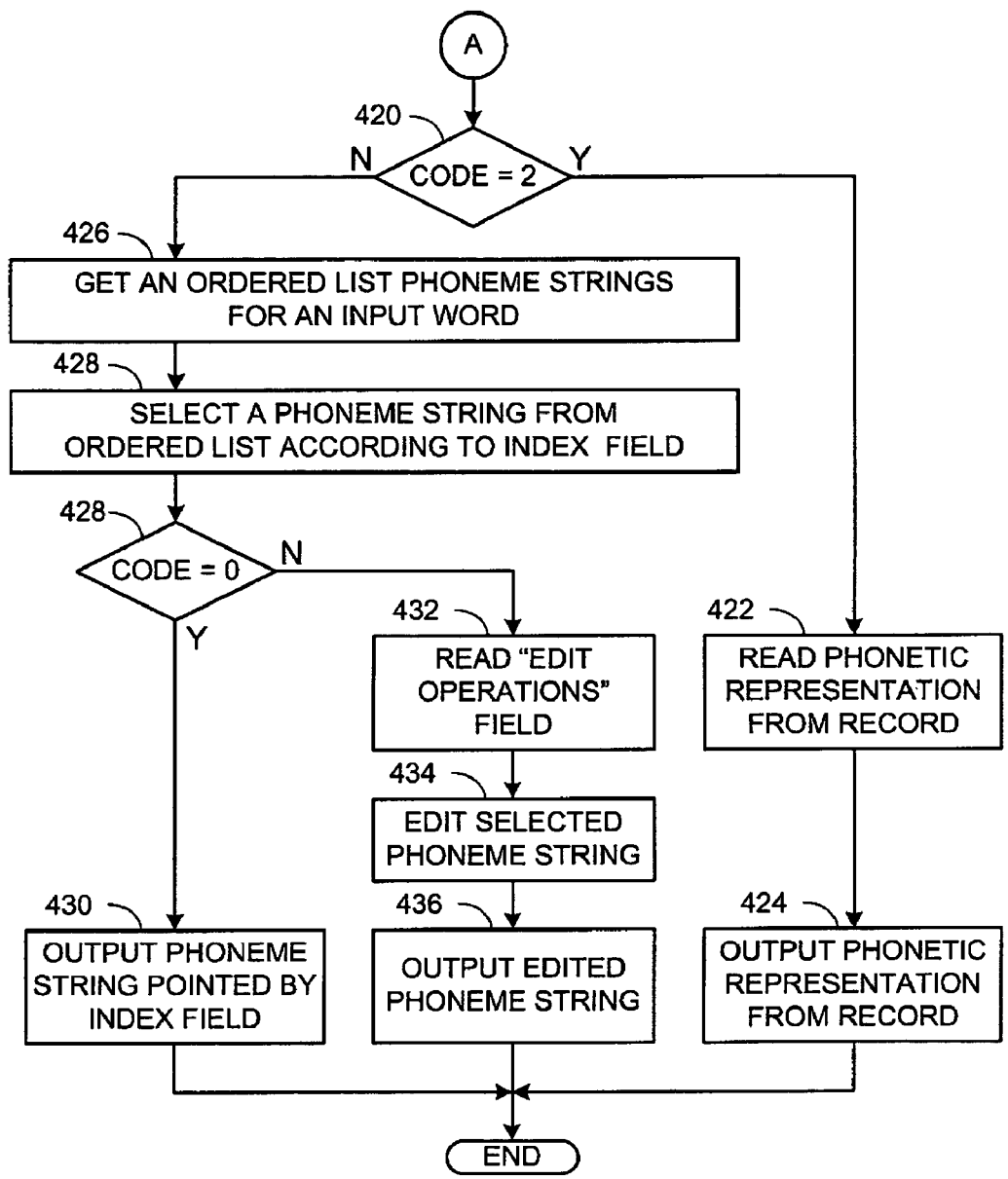

Reference is now made to FIGS. 8 and 9, which are a flowchart illustration of an exemplary method to extract a phoneme string from a compressed pronunciation lexicon file using a pronunciation prediction algorithm in a multi-output mode, according to some embodiments of the invention. The method of FIGS. 8 and 9 may be implemented in phoneme string extraction module 56 of FIG. 1.

Phoneme string extraction module 56 may receive a textual representation of an input word (400) and may read Huffman coding table 136 and index table 150 of compressed pronunciation lexicon file 52 (402). Phoneme string extraction module 56 may scan index table 150 for a particular entry 152 having a particular index 154 that alphabetically succeeds all indexes 154 that alphabetically precedes the input word (404).

Phoneme string extraction module 56 may get to the record in list 131 pointed to by pointer 156 of the particular entry 152 (406), and may decode a textual string from Huffman coding table 136 and from prefix length field 130 and Huffman encoded suffix field 138 of the record (408). If the textual string is not identical to the input word (410), and if the textual string is alphabetically larger than the input word (412), phoneme string extraction module 56 may report that the input word is not found in compressed pronunciation lexicon file 52 (414), and the method may terminate.

If the textual string is not alphabetically larger than the input word, phoneme string extraction module 56 may point to the next record (416) and may continue to box (408). The sequence (408), (410), (412), (416) may be repeated until a textual string decoded from a record is identical to the input word (410), or until a textual string decoded from a record is alphabetically larger than the input word (412).

If a textual string that is decoded from a particular record is found to be identical to the input word in (410), phoneme string extraction module 56 may read code field 144 of the particular record (418). If code field 144 equals the number two (420), phoneme string extraction module 56 may read the phonetic representation 114 from the particular record (422), may output a phoneme string that is equal to the phonetic representation 114 (424) and may terminate.

However, if code field 144 does not equal the number two, phoneme string extraction module 56 may call pronunciation prediction module 54 with the input word as a parameter. As a result, pronunciation prediction module 54 may output a deterministic ordered list 500 of phoneme strings 502 (426), shown in FIG. 1. Phoneme string extraction module 56 may select the phoneme string 502 indexed by index field 146 of the particular record (428).

If code field 144 equals the number zero (428), phoneme string extraction module 56 may output the phoneme string 502 indexed by the index field of the record (430) and may terminate.

If code field 144 equals the number one (428), phoneme string extraction module 56 may read edit operations field 148 of the particular record (432) and may edit the phoneme string 502 indexed by the index field of the record accordingly (434). Phoneme string extraction module 56 may output the edited phoneme string (436) and may terminate.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
   generating a compressed pronunciation lexicon file from a source pronunciation lexicon using a pronunciation prediction algorithm in a multi-output mode;
   wherein the source pronunciation lexicon includes a list of textual representations of words and corresponding phonetic representations of the words; and
   wherein generating the compressed lexicon file further includes:
      sorting the list in alphabetical order of the textual representations to generate a sorted list;
      substituting a textual representation of a particular word with i) the length of a common string of initial letters of the textual representation and the textual representation of a preceding word in the list, and ii) an encoded version of the remaining letters of the textual representation of the particular word.

2. The method of claim 1, wherein generating the compressed lexicon file further includes:
   generating a Huffman-encoded version of the remaining letters of the textual representation of the particular word and embedding a Huffman coding table or tree in the compressed file.

3. The method of claim 1, further comprising:
   embedding an index table in the compressed file, the index table containing pointers to selected records of the sorted list such that the selected records are substantially evenly distributed along the sorted list.

4. The method of claim 1, wherein using the pronunciation prediction algorithm includes using a pronunciation prediction algorithm that is based on a hidden Markov model.

5. The method of claim 1, wherein using the pronunciation prediction algorithm in the multi-output mode includes:
   generating a deterministic ordered list of phoneme strings for a particular one of the words.

6. The method of claim 5, wherein a particular one of the phoneme strings is identical to the corresponding phonetic representation of the particular word, and generating the compressed pronunciation lexicon file further includes:
   substituting the corresponding phonetic representation of the particular word with an index of the particular one of the phoneme strings.

7. The method of claim 5, wherein none of the phoneme strings is identical to corresponding phonetic representation of the particular word, and generating the compressed pronunciation lexicon file further includes:
   substituting the corresponding phonetic representation of the particular word with an index of a most closely matching one of the phoneme strings and an encoded representation of edit operations to convert the most closely matching phoneme string into the corresponding phonetic representation of the particular word.

8. An article comprising a computer-readable storage medium having stored thereon a compressed pronunciation lexicon file comprising:
   a sorted list of records of textual representations of words and compressed phonetic representations of the words, the compressed phonetic representations generated using a pronunciation prediction algorithm in a multi-output mode,
   wherein the textual representations of words are compressed textual representations including prefix lengths and encoded suffixes, wherein a prefix length of a particular word is the length of a common string of initial letters of a textual representation of the particular word and the textual representation of a preceding word in the sorted list, and wherein an encoded suffix is an encoded version of the remaining letters of the textual representation of the particular word.

9. The article of claim 8, wherein the compressed pronunciation lexicon further comprises an index table including pointers to selected records of the sorted list such that the selected records are substantially evenly distributed along the sorted list.

10. An article comprising a computer-readable storage medium having stored theron instructions that, when executed by a processor, result in:
    generating a compressed pronunciation lexicon file from a source pronunciation lexicon using a pronunciation prediction algorithm in a multi-output mode;
    wherein the source pronunciation lexicon includes a list of textual representations of words and corresponding phonetic representations of the words; and
    wherein generating the compressed lexicon file further includes:
       sorting the list in alphabetical order of the textual representations to generate a sorted list;
       substituting a textual representation of a particular word with i) the length of a common string of initial letters of the textual representation and the textual representation of a preceding word in the list, and ii) an encoded version of the remaining letters of the textual representation of the particular word.

11. The article of claim 10, wherein generating the compressed lexicon file further includes:
    generating a Huffman-encoded version of the remaining letters of the textual representation of the particular word and embedding a Huffman coding table or tree in the compressed file.

12. The article of claim 10, wherein the instructions further result in:
    embedding an index table in the compressed file, the index table containing pointers to selected records of the sorted list such that the selected records are substantially evenly distributed along the sorted list.

13. The article of claim 10, wherein using the pronunciation prediction algorithm includes using a pronunciation prediction algorithm that is based on a hidden Markov model.

14. The article of claim 10, wherein using the pronunciation prediction algorithm in the multi-output mode includes:
    generating a deterministic ordered list of phoneme strings for a particular one of the words.

15. The article of claim 14, wherein a particular one of the phoneme strings is identical to the corresponding phonetic representation of the particular word, and generating the compressed pronunciation lexicon file further includes:
    substituting the corresponding phonetic representation of the particular word with an index of the particular one of the phoneme strings.

16. The article of claim 14, wherein none of the phoneme strings is identical to corresponding phonetic representation of the particular word, and generating the compressed pronunciation lexicon file further includes:
    substituting the corresponding phonetic representation of the particular word with an index of a most closely matching one of the phoneme strings and an encoded representation of edit operations to convert the most closely matching phoneme string into the corresponding phonetic representation of the particular word.

* * * * *